United States Patent [19]

Holm

[11] Patent Number: 4,706,752

[45] Date of Patent: Nov. 17, 1987

[54] METHOD FOR FOAM EMPLACEMENT IN CARBON DIOXIDE ENHANCED RECOVERY

[75] Inventor: LeRoy W. Holm, Fullerton, Calif.

[73] Assignee: Union Oil Company of California, Los Angeles, Calif.

[21] Appl. No.: 677,182

[22] Filed: Dec. 3, 1984

[51] Int. Cl.$^4$ .............................................. E21B 43/22
[52] U.S. Cl. ..................................... 166/273; 166/274
[58] Field of Search ............... 166/273, 274, 285, 294, 166/300, 305.1, 309

[56] References Cited

U.S. PATENT DOCUMENTS

| | | | |
|---|---|---|---|
| 3,342,256 | 9/1967 | Bernard et al. | 166/273 |
| 3,376,924 | 4/1968 | Felsenthal et al. | 166/273 |
| 3,491,832 | 1/1970 | Raza | 166/273 |
| 3,529,668 | 9/1970 | Bernard et al. | 166/273 |
| 3,599,715 | 8/1971 | Roszelle | 166/273 |
| 3,782,470 | 1/1976 | West et al. | 166/303 |
| 3,893,511 | 7/1975 | Root | 166/274 |
| 3,948,323 | 4/1976 | Sperry et al. | 166/303 |
| 4,088,190 | 5/1978 | Fischer et al. | 166/274 |
| 4,113,011 | 9/1978 | Bernard et al. | 166/273 |
| 4,330,038 | 5/1982 | Soukup et al. | 166/267 |
| 4,390,068 | 6/1983 | Patton et al. | 166/267 |
| 4,495,995 | 1/1985 | Chen et al. | 166/273 |
| 4,572,294 | 2/1986 | Duerksen et al. | 166/274 |

*Primary Examiner*—Stephen J. Novosad
*Assistant Examiner*—Bruce M. Kisliuk
*Attorney, Agent, or Firm*—Dean Sandford; Gregory F. Wirzbicki; June M. Bostich

[57] ABSTRACT

The permeability of higher permeability zones of a subterranean reservoir of heterogeneous permeability is reduced by injecting an aqueous solution of a water soluble surface active agent and then a gas mixture comprising carbon dioxide and a noncondensible, non-hydrocarbon gas insoluble in viscous crude. A stable foam forms in situ useful for blocking escape of solvent fluids into the higher permeability zones of the reservoir during enhanced recovery, typically by carbon dioxide flooding.

Preferably, the solution of surface active agent and the gas mixture are injected in alternating slugs to enhance foam formation.

54 Claims, No Drawings

METHOD FOR FOAM EMPLACEMENT IN CARBON DIOXIDE ENHANCED RECOVERY

BACKGROUND OF THE INVENTION

The present invention relates to a process of stimulating oil recovery from subterranean reservoirs or formations utilizing injection of gases. It is more specifically concerned with improving he efficiency of a secondary oil recovery process wherein carbon dioxide is used as a viscosity-reducing agent.

Significant quantities of low gravity crude oil exist in underground formations. Because of this, techniques have been developed for stimulating production of oil from such reservoirs the high viscosity of the oil remaining in such formations makes recovery difficult and expensive. A number of methods designed to stimulate recovery of high viscosity petroleum have been used, including water flooding, steam injection, and gas injection, but none to date has been totally satisfactory. Typically, water flooding is inefficient for displacing viscous oil due to its high viscosity. Steam injection lowers viscosity, but is also unsatisfactory in certain types of formations and requires availability of inexpensive fuel and a large supply of clean water. A recent variation of the "huff and puff" steam injection method for reducing the viscosity of viscous oil is disclosed by West in U.S. Pat. No. 3,782,470. In "huff and puff" steam injection, the well is used for alternate injection of steam and production of reservoir fluids. In the recent variation, immediately following the injection phase of a "huff and puff" steam stimulation process, which lowers viscosity of the oil, a non-condensing, non-oxidizing gas is injected at ambient temperature. The gas displaces the low viscosity oil and thereby improves oil production rates, reduces the volume of steam required, and improves the water-oil ratio of the well. However, where a multi-component gas is employed, such as natural gas, the higher molecular weight hydrocarbons tend to condense as the formation cools following steam injections. The condensed hydrocarbons have high solubility and even miscibility with most crudes. As a result, crude oil may be miscibly displaced from the vicinity of the wellbore, resulting in reduced permeability to oil at the well bore.

Many types of chemical additives have also been evaluated to enhance the flow of viscous oil, such as surfactants and soluble oils. A solvent may be used to effectively reduce the viscosity of the oil, but unless the solvent remains soluble, it will usually be produced preferentially to the oils as an immiscible, mobile phase. One of the most successful solvents used to stimulate recovery of viscous oils is carbon dioxide. The high solution factor of carbon dioxide in crude oil causes the viscosity of the carbon dioxide-crude oil solution to be markedly lower than that of the crude alone. For illustrative examples of stimulation processes utilizing carbon dioxide, reference is made to U.S. Pat. No. 3,442,332, which incorporates a list of U.S. patents and publications on the subject at column 2, lines 24 through 49.

In oil recovery, two general types of processes utilizing carbon dioxide, typically in a gaseous form, are common. Where direct communication between adjacent wells exists or can be established, carbon dioxide may be introduced into the formation by one or more injection wells and the solution of crude oil and carbon dioxide withdrawn through one or more production wells. A second method uses the "huff and puff" technique employing the same well for alternate injection and production. This latter method is useful where communication between wells has not been established. Usually, carbon dioxide is introduced into the well, the formation is closed off to allow absorption of the carbon dioxide, and the resulting carbon dioxide-crude oil solution expands to fill the void spaces of the reservoir. The expanded solution will spontaneously flow or can be pumped to the surface once the well is reopened.

In U.S. Pat. No. 4,390,068, an improvement upon these methods of using carbon dioxide to stimulate oil production results from introducing the solvent into the formulation as a liquid under a back pressure as low as about 300 p.s.i.g. Liquid carbon dioxide can be placed into the formation at about twice the mass rate of gas injection and is believed also to be more effective than gaseous carbon dioxide for displacing unwanted water saturation associated with the residual crude oil. As a result, oil recovery increases while water recovery decreases. In addition, maintaining the back pressure at no more than 300 p.s.i.g. displaces little oil from the wellbore. Resaturating the area of displaced oil surrounding the wellbore before production can begin is therefore not required.

It has long been known that recovery of petroleum using carbon dioxide could be greatly increased if the carbon dioxide were used in slug form and driven through the reservoir by an aqueous drive fluid, such as saline, plain, or carbonated water. A process using this technique is disclosed by Holm in U.S. Pat. No.3,065,790. However even alternate-injection, water-solvent processes using carbon dioxide as a solvent succeed in recovering only the petroleum in the reservoir contacted by the injected carbon dioxide. Large quantities of uncontacted petroleum are by-passed and left in the reservoir because an unfavorable mobility relationship between reservoir fluids and injected fluids causes the carbon dioxide to channel off into areas of high permeability. In the art of oil recovery, the areal sweep efficiency of oil displacement is greatest when the viscosity of the displacing fluid is equal to or greater than the viscosity of the displaced oil and/or the permeability of the displacing fluid is less than or equal to that of the oil. Since carbon dioxide is less viscous and more mobile than most crude oils, it is not of itself a very efficient oil displacement agent.

The areal sweep efficiency of carbon-dioxide recovery is increased by generating a foam in situ to block the highly permeable features of the underground formation. U.S. Pat. No. 3,342,256 to Bernard et al. (which is hereby incorporated by reference in its entirety) discloses alternative methods for generating foam in situ to prevent channeling of carbon dioxide into high permeability channels away from the zone to be treated. In one embodiment, a small amount of a surfactant or foaming agent is dissolved in the carbon dioxide, which is maintained as a dense fluid or liquid at pressures in excess of about 700 p.s.i.g. to ensure solubility. A subsequently injected drive medium, such as water, forces the carbon dioxide-surfactant mixture through the formation to a production well where production continues until the produced fluids exhibit an undesirably high water/oil ratio. Production is then terminated, and the formation is depressurized to allow dissolved gases to come out of solution and form the foam. As the foam expands, it drives additional oil towards the producing well.

In an alternative embodiment, alternate slugs of the foaming agent, usually dissolved in an aqueous or hydrocarbon vehicle, and the carbon dioxide are introduced into the reservoir. When a hydrocarbon vehicle is employed, the liquid light hydrocarbons will flash, producing a gas to generate foam in the areas of the reservoir of high pressure gradient, such as is found in high permeability channels. If a carbonated water vehicle is used to dissolve the foaming agent, upon encountering such areas of reduced pressure, the carbon dioxide will come out of solution and generate foam. The foam generated in situ by these released gases blocks the highly permeable strata and will prevent subsequently injected slugs of carbon dioxide from channeling into highly permeable zones.

Relying upon gases released in low pressure zones to generate the foam, however, presents certain disadvantages. When the foaming agent is dissolved directly into carbon dioxide or into carbonated water, a large portion of the gaseous carbon dioxide released in the low pressure zone does not go to generating foam, but is preferentially absorbed into the crude. And if the released carbon dioxide migrates into a high pressure region, solubility of carbon dioxide is increased and may approach miscibility at pressures in excess of about 700 p.s.i.g. These difficulties are not encountered if the foaming agent is dissolved in a hydrocarbon vehicle, but the cost of liquid hydrocarbons is generally prohibitive. Moreover, a hydrocarbon-soluble surface-active agent generally foams the oil and restricts its movement through the reservoir. The upshot is that increasing the areal sweep efficiency of the recovery method by generating foam in situ is much more difficult and expensive in the reservoir than laboratory results might otherwise indicate.

Accordingly, while each of the foregoing methods has met with some success, the need exists for further developments in enhanced oil recovery. For example, a need exists for an improved method of blocking the highly permeable zones of producing formations during carbon dioxide flooding so that the solvent is not lost into the highly permeable, relatively oil-free zones but contacts a larger cross-section of the oil-bearing strata. What is particularly needed is a method for injecting gaseous carbon dioxide in conjunction with an aqueous solution of surface active agent and a noncondensible, crude-oil insoluble gas. The insoluble, noncondensible gas will neither dissolve in the oil in place nor condense to a liquid, but remains free to generate foam of the aqueous solution in the highly permeable features of the formation. The foam generated in situ by this process will block the highly permeable zones and divert subsequently injected solvent into the less permeable, oil-containing zones, thereby substantially increasing the efficiency of oil recovery.

SUMMARY OF THE INVENTION

A method is provided for reducing the permeability zones of a subterranean reservoir having heterogeneous permeability and being penetrated by at least one well in which there is injected through a well into the reservoir (1) an aqueous liquid solution of a water soluble surface active agent, and (2) a gas mixture comprising carbon dioxide and a crude oil-insoluble, noncondensible, non-hydrocarbon gas, the injection being under conditions such that the gas mixture maintains a density between 0.01 and 0.42 grams per centimeter in the reservoir. Then a stable foam is allowed to form in the higher permeability zones of the reservoir. As a result, subsequently injected carbon dioxide flooding gas is diverted into the less permeable zones of the formation and oil recovery is thereby enhanced.

DETAILED DESCRIPTION OF THE INVENTION

The present invention provides a method for increasing the areal sweep efficiency of carbon dioxide flooding for recovery of viscous oil, especially gaseous carbon dioxide flooding, from subterranean formations. During the course of carbon dioxide flooding, breakthrough of carbon dioxide at a producing well signals the need for plugging highly permeable zones of the formation. The foam emplacement process of this invention, therefore, is typically instituted midway in a carbon dioxide flooding regime, especially a flood utilizing carbon dioxide in a gaseous state. To maintain carbon dioxide as a gas, injection pressures are adjusted so that the density of the carbon dioxide remains below the critical density of 0.42 grams per centimeter, typically between 0.01 and 0.42 grams per centimeter.

In accordance with the present invention, an aqueous, liquid solution of a surfactant or foaming agent is injected into a well penetrating an oil-bearing formation, especially a formation containing viscous oil, such as a crude having an API gravity of below about 22° and viscosity greater than about 200 centipoise at 60° F. Following injection of the liquid solution, a noncondensible, crude oil-insoluble non-hydrocarbon gas is added to gaseous carbon dioxide, and the resulting gaseous mixture is injected into the formation. These recovery fluids are driven through the reservoir by a subsequently injected aqueous flooding medium which displaces them towards at least one production or output well completed in the same reservoir.

As the fluids pass through the reservoir, the noncondensible, crude-oil insoluble, non-hydrocarbon gas and the solution of surfactant or foaming agent interact within the reservoir to form a stable foam in those areas of the formation where the least resistance is presented to the passage of fluids. These locations of high permeability will contain little crude oil to depress foam formation, either because little oil is present due to previous treatment or because the carbon dioxide introduced in accordance with this invention dissolves readily in the oil in place and the decreased viscosity oil passes from the zones of high permeability. By contrast, in the less permeable zones of the formation, the oil in place depresses foam formation. As a result, foam preferentially forms in and blocks passage of fluids through the highly permeable, relatively oil-free features of the reservoir, including strata, cracks and fissures. Consequently, the foam diverts carbon dioxide, which is highly soluble in crude oil, into the less permeable, oil-containing zones of the reservoir where it is absorbed by the crude oil. As the carbon dioxide is absorbed, the viscosity of the carbon dioxide-crude oil solution decreases markedly. As a result, a subsequently injected drive fluid, typically aqueous, can readily move the solution towards a producing well where petroleum and other fluids are recovered by conventional means.

The injection and production wells can be arranged in any convenient pattern designed to achieve maximum contact of the oil-bearing zones by the advancing flood front—such as the conventional "five-spot" pattern of a central producing well surrounded by four somewhat symetrically located injection wells. Another conventional flooding pattern that can be employed in the practice of this invention is the "line-drive" pattern in which the injection wells are arranged in a line so that the injected flooding medium advances through the formation to displace oil toward one or more spaced production wells arranged in a line substantially parallel to the line of injection wells.

The non-condensible, crude oil-insoluble non-hydrocarbon gas used in the process of this invention usually comprises a non-hydrocarbon gas that is substantially both noncondensible and insoluble in crude oil at typical reservoir conditions of between about 90° and 180° F. and between about 700 and 2500 p.s.i.g. of pressure. Typically, the noncondensible, crude oil-insoluble, non-hydrocarbon gas is selected from the group consisting of air, nitrogen, and argon, or mixtures thereof, and preferably is nitrogen. The proportion of non-condensible, crude, oil-insoluble, non-hydrocarbon gas in the gas mixture is typically between about 5 and 20 volume percent, and preferably between about 10 and 15 volume percent.

Surface active agents suitable for use in the practice of this invention are water soluble, and should have sufficient foaming ability and stability to form a stable foam in the highly permeable zones of a reservoir, thereby preventing carbon dioxide from channeling through highly permeable fissures, cracks or strata. More particularly, the term "surface active agent" as used in this specification and the appended claims denotes a surfactant or foaming agent having a tendency to generate foam, or to promote the generation of foam, in an underground reservoir or formation in the presence of a liquid and a gas. Such agents are known to alter the interface between liquid and gas phases or between two immiscible phases.

Non-limiting examples of surface active agents useful in this invention are those which, when incorporated in an aqueous liquid such as water or seawater in an amount not in excess of 5 percent by weight, meet the following described test. The surface active agent is dissolved in an aqueous test medium and 500 milliliters of the solution is placed in a graduated cylinder to form a column having a height of 50 centimeters. Natural gas is passed into the bottom of the column through a fritted glass disc at substantially atmospheric pressure so that the gas bubbles through the column of liquid and passes out of the top of the cylinder. The gas rate is maintained at about 500 milliliters of gas per minute per square inch of column cross-sectional area, and the flow of gas is continued for a period of 15 minutes. A column of foam will then be found to exist at the top of the column of liquid hydrocarbon or water. The surface active agent, generally a foaming agent or surfactant, should desirably, but not necessarily, be capable of producing a column of foam not less than 180 centimeters in height under the conditions aforedescribed.

With some surface-active agents, the aforedescribed test requirements will be met by incorporating quantities of surfactant or foaming agent far less than 2 percent by weight in the aqueous test medium. Thus, where it is found that 1 percent by weight of a given surface active agent is capable of meeting the requirements of the aforedefined test, it is preferred for reasons of economy that this amount be used. But typically the concentration of surface-active agent in the aqueous solution is between about 0.1 and 2.0 weight percent active surface-active agent. The use of excessive quantities of surfactant or foaming agents should be avoided not only for reasons of economy but also to prevent the production of an excessively thick and viscous foam bank, which might require the use of costly, high injection pressures.

The use of various commercial high-foaming surfactants or foaming agents is contemplated. An example of a water-soluble surfactant or foaming agent preferred for promoting the formation of foam in oil-bearing reservoirs is alkyl polyethylene oxide sulfate, known commercially under the trade name "Alipal CD 128" and marketed by General Aniline and Film Corporation. In the preferred embodiment, the water-soluble surface active agent is selected from the group consisting of dioctyl sodium sulfosuccinate, modified ether alcohol sulfate sodium salts, sodium lauryl sulfate, dioctyl sodium sulfosuccinate, and alkyl polyethylene oxide sulfates. Other examples of suitable foam-producing agents include dimethyl didodecenyl ammonium chloride, methyl trioctenyl ammonium iodide, trimethyl decenyl ammonium chloride, dibutyl dihexadecenyl ammonium chloride, and water-soluble salts of esters of $C_3$–$C_6$ sulfur dicarboxylic acids having the general formula

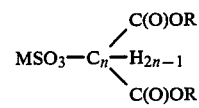

where M is a substituent forming a water-soluble salt, such as alkali metals, ammonium, and substituted ammonium, R is a $C_3$–$C_{16}$ alkyl substituent, and n is an integer from 1–4, e.g., monosodium dioctyl sulfosuccinate, ammonium dilaurylsulfosuccinate, monosodium dibutyl sebacate, monosodium diamyl sulfoadipate, and others. Still other suitable foam-producing agents include water-soluble perfluoroalkanoic acids and salts having 3–24 carbon atoms per molecule, e.g., perfluorooctanoic acid, perfluoropropanoic acid, and perfluorononanoic acid. Other surfactive agents which may be used in the practice of this invention are modified fatty alkylolamides, polyoxyethylene alkyl aryl ethers, sodium lauryl sulfate, and octylphenoxyethanols as well as the following commercial products:

| Trade Name | Chemical Name |
|---|---|
| Aerosol C-61 | Ethanolated alkyl guanidine-amine complex |
| Aerosol OS | Isopropylpaphthalene sodium sulfonate |
| Aerosol OT | Dioctyl sodium sulfosuccinate |
| Duponol EP | Alkyl alkylolamine sulfate |
| Duponol RA | Modified ether alcohol sulfate sodium salt |
| Duponol WAQ | Sodium lauryl sulfate |
| Ethomid HT-15 | Condensation of hydrogenated tallow amide and ethylene oxide |
| Miranol HM Concentrate | Ethylene cyclomido 1-lauryl, 2-hydroxy ethylene Na alcoholate, methylene Na carboxylate |
| Miranol MM | Same as Miranol HM except myristyl group is substituted for lauryl group |
| Nacconal 4OF | Alkyl arylsulfonate |
| Petrowet R | Sodium hydrocarbon sulfonate |
| Pluronic L44 | Condensation product propylene oxide with ethylene oxide |
| Sorbit AC | Sodium alkyl napthalene sulfonate |
| Sulfanole FAF | Sodium salt of fatty alcohols, sulfated. |
| Triton X-100 | Octylphenoxy polyethoxy ethanol. |
| Span 20 | Sorbitan Monolaurate |
| Span 40 | Sorbitan Monopalmitate. |
| Span 85 | Sorbitan Trioleate |
| Tween 65 | Polyoxyethylene Sorbitan Tristearate |
| Tween 81 | Polyoxyethylene Sorbitan Monooleate |
| Triton GR-7 | Dioctyl Sodium Sulfosuccinate |
| Triton B-1956 | Modified Phthalic Glycerol Alkyl Resin |

| Trade Name | Chemical Name |
|---|---|
| Triton X-45 | Octylphenoxy polyethoxy ethanol |
| Triton X-100 | Acetylphenoxy polyethoxy ethanol |

Generally, during the course of a carbon dioxide flooding regime, treatment of the reservoir by foam emplacement does not begin until the breakthrough of carbon dioxide gas from the gas flooding mixture at the producing well signals escape of the solvent gas into high permeability zones. Therefore, foam emplacement typically commences after a gas flooding mixture comprising carbon dioxide has been injected into the reservoir until the breakthrough of carbon dioxide is detected at the producing well. Then the foam emplacement regime is instituted, typically beginning with injection of the surface active solution and ending with injection of the gas mixture comprising carbon dioxide and a crude oil-insoluble, noncondensible, non-hydrocarbon gas. During foam emplacement, alternate injection of slugs of the surface active solution and of the gas mixture can be repeated for as many cycles as is desired to block the highly permeable zones. After foam emplacement, injection of the gas flooding mixture is typically resumed.

To determine effectiveness of the foam emplacement procedure or the point at which the highly permeable zones have been effectively plugged, comparative tests such as tests to determine injectivity to gas and the permeability of the formation, or of any selected zones of the formation, can be conducted. Preferably test results obtained before foam emplacement is undertaken are compared with results obtained at convenient intervals during foam emplacement to determine the progress and result of the foam emplacement regime.

During foam emplacement, dilution of the solvent gas with an insoluble gas will result in decreased rather than increased oil recovery if the proportion of insoluble gas becomes too large. What proportion of insoluble gas will be effective in the particular reservoir to be treated will depend in part upon pressure and temperature in the reservoir and what proportion of the total pore volume of the reservoir is occupied by highly permeable zones and features. It has been found in the practice of this invention that when a solution of surfactant or foaming agent is injected in conjunction with the mixture of carbon dioxide and insoluble gases, generally dilution of the solvent carbon dioxide gas with up to 20 volume percent of crude oil-insoluble, noncondensible, non-hydrocarbon gas is effective for increasing oil recovery over that achieved by injection of the solvent gas alone.

The amount of the gas mixture injected into the subterranean formation will also vary for different formations, and will depend upon total reservoir pore volume, crude oil pore volume, formation pressure and temperature and other unique formation characteristics. Throughout this description and the appended claims the term "effective pore volume" means that portion of the reservoir expected to be contacted by the carbon dioxide-containing gas mixture injected.

To achieve the best success in carrying out the process of this invention, typically a total of between about 0.01 and 0.2, and preferably between about 0.01 and 0.05, effective pore volume of the foam emplacement gas mixture containing carbon dioxide and a noncondensible, crude oil-insoluble, non-hydrocarbon gas is injected through an input or injection well into the formation. The carbon dioxide in the gas mixture is injected as a gas or dense fluid under conditions such that in the reservoir the carbon dioxide is gaseous, the gas mixture having a density at or below the critical density for carbon dioxide of 0.42 grams per cubic centimeter.

The amount of surfactant or foaming agent used will be determined according to the requirements of the reservoir being treated, but generally it has been found that for successful foam emplacement the solution of surface active agent should represent between about 0.1 and 10 volume percent of the total injected fluids, exclusive of the drive fluid. Or, expressed in terms of the effective pore volume of the reservoir to be treated, between about 0.01 and 0.2 effective pore volume of a 0.1 to 2.0 weight percent active solution of surfactant or foaming agent will be effective. More preferably, between about 0.01 and 0.05 effective pore volume of a 0.5 to 1.0 weight percent active solution of surfactant or foaming agent is injected followed by injection of between about 0.01 and 0.05 effective pore volume of the foam emplacement gas mixture. Then, injection of the remaining amount of between about 0.1 to 1.0 effective pore volume of the carbon dioxide-containing gas flooding mixture is resumed. Alternatively injection of a gas flooding mixture comprising carbon dioxide is resumed until one effective pore volume of carbon dioxide has been introduced into the reservoir.

In an alternative and preferred embodiment, during foam emplacement the gas mixture and solution of surface active agent are injected alternately in small slugs to facilitate contact between the insoluble gas, the foaming agent, and reservoir fluids. More particularly, at the point during a typical carbon dioxide flood that breakthrough of carbon dioxide gas occurs at a producing well, foam emplacement typically is started. Alternately, slugs of the surface active solution and of the aforedescribed foam emplacement gas mixture are injected. The slugs are typically as small in size as is economically feasible while achieving the goal of maximum contact between the insoluble gas and the foaming agent and the size of the slugs of gas mixture are up to 10 times the size of the surfactant slugs. Preferably the slugs of the solution of surface active agent are between about 0.001 and 0.01 effective pore volume in size, while the foam emplacement slugs of the gas mixture are preferably between about 0.002 and 0.1 effective pore volume in size.

This regime of alternately injected slugs of foam emplacement gas mixture and surfactant solution usually continues until sufficient foam has been generated in the reservoir to block the highly permeable zones and features. Typically between about 4 and 10 cycles of alternation are required. Tests to determine gas injectivity and permeability are usually conducted to determine when the highly permeable zones have been satisfactorily plugged. In the preferred embodiment, a total of between about 5 and 7 cycles of gas flooding mixture and surfactant solution is injected, followed by continuous injection of the gas mixture until a cumulative total of about one effective pore volume of carbon dioxide has been injected.

To propel the bank of chemical additives through the reservoir, a drive medium having a favorable mobility ratio with respect to the mixture of fluids to be moved through the reservoir is employed. The drive medium typically comprises fresh, saline or carbonated water, or any mixture of these, and preferably contains a thickening agent to improve the mobility ratio between the drive fluid and the reservoir fluids. Sufficient drive medium is employed to push the carbon dioxide through the reservoir from the injection well to a production well. Injection of the drive fluid is usually continued until the liquids produced from the production well have a high water/oil ratio, at which time injection of drive fluid is commonly terminated. Subsequent to terminating injection of the drive fluid, the formation can be depressurized to allow formation of additional foam by any gases coming out of solution or to drive additional oil towards the production well.

Specific embodiments of the practice of this invention are illustrated by the following examples.

EXAMPLES 1 to 4

Comparative tests are run to determine the effect of adding a crude oil-insoluble, noncondensible, nonhydrocarbon gas to the gaseous carbon dioxide used in a carbon dioxide foam flood of a Berea sandstone core. Four flooding sequences are conducted at a temperature of 127° F. The first test uses continuous injection of carbon dioxide alone, and the second test employs alternately injected slugs of carbon dioxide and water. In the second pair of tests, a method employing continuous injection of a gas mixture of carbon dioxide and nitrogen followed by injection of water is compared with a method of alternate injection of slugs of the carbon dioxide-nitrogen gas mixture and an aqueous surfactant solution.

To prepare for the flooding tests, a 1½ inch by 1½ inch by 4 feet Berea sandstone core is evacuated of air by pulling a vacuum on the outlet and closing the inlet. After 8 hours, the inlet is opened and the core is flooded by seawater. The original pore volume is measured and the permeability of the core to seawater are then measured using an ISCO positive displacement pump. To saturate the core with crude oil, Wilmington heavy crude oil having a viscosity of 14° API or 450 centipoise is injected into the core while sufficient seawater is displaced therefrom to saturate the core to 0.77 of the original pore volume. Then, to displace from the core the oil that would be recovered during primary water flooding, one pore volume of seawater is injected while sufficient crude oil is displaced to leave between 0.4 and 0.6 pore volume of residual oil saturation.

In Test 1, carbon dioxide at ambient temperature and a pressure of 950 p.s.i.g. is continuously injected into a Berea core at 127° F. prepared by the foregoing procedure using a pressurized cylinder of carbon dioxide. Following injection of 120 liters of carbon dioxide, a seawater drive of one pore volume is injected to displace the bank of carbon dioxide through the core. The displaced fluids are collected and measured and the percent recovery of the residual oil is calculated.

In test 2, slugs of carbon dioxide are alternately injected with slugs of seawater into a Berea core prepared as in Test 1. Slugs of carbon dioxide of 0.02 pore volume in size are injected at a pressure of 950 p.s.i.g. alternately with 0.05 pore volume slugs of seawater until a total of 5 slugs of each has been injected. Then carbon dioxide alone is continuously injected until a total of 120 liters of carbon dioxide has been injected. To displace fluids from the core, one pore volume of seawater drive is injected while the displaced fluids are collected and measured. The percent recovery of residual oil is calculated.

In Test 3, a gas mixture containing 11 volume percent of nitrogen and 89 volume percent of carbon dioxide is injected into a Berea core prepared as described in Test 1. The gas mixture is continuously injected at ambient temperature and a pressure of 950 p.s.i.g. using a pressurized cylinder of carbon dioxide until 120 liters have been injected. Then a seawater drive of one pore volume size is injected to push the bank of gas mixture through the core. Displaced fluids are collected and measured, and the percent recovery of the residual oil is calculated.

To determine the effect upon oil recovery of an alternately injected foam emplacement carbon-dioxide flood, in Test 4, slugs of a foam-generating surfactant solution are alternately injected with slugs of the carbon dioxide-nitrogen gas mixture used in Test 3. More particularly, a 0.6 volume percent active solution of Alipal CD 128 surfactant marketed by the GAF Corporation is prepared using seawater as the diluent. The gas mixture used in Test 2 is injected using the methods of Test 2 above until the breakthrough of gas at the producing end of the core. Following gas breakthrough, a 0.05 pore volume slug of the surfactant solution is followed by a 0.02 pore volume slug of the gas mixture. Then continuous injection of the carbon dioxide-insoluble gas mixture is resumed until a total of 120 liters in all of the gas mixture has been injected. Finally, to displace fluids from the core, one pore volume of seawater drive is injected. Displaced fluids are collected and measured, and the percent recovery of the residual oil is calculated.

TABLE I

Results of Carbon Dioxide Flooding Tests

| Test No. | Flooding regime | Oil Recovery (% OIP)* | $CO_2$ utilization (MCF of $CO_2$/bbl of oil recovery) |
|---|---|---|---|
| 1 | $CO_2$ slug followed by water | 35 | 6 |
| 2 | $CO_2$ slugs alternately injected with water slugs | 35 | 3 |
| 3 | $CO_2$ slug containing nitrogen followed by water | 25 | 5 |
| 4 | $CO_2$ slug containing nitrogen alternately injected with slugs of foaming solution | 45 65 | 1 6 |

*OIP means residual oil in place after primary recovery by water flooding.

The results of Tests 1 to 4 are summarized in Table I. As can be seen by comparison of the results, the alternate injection foam emplacement method of Test 4 in accordance with this invention results in a significantly higher percent recovery of oil in place than any of the other methods used. Moreover, with this method the greatest recovery per barrel of carbon dioxide injected occurs early in the flooding regime. Comparison of results from Tests 1 and 4 shows that, when 45 percent of the residual oil has been recovered using alternate injection foam emplacement, the carbon dioxide requirement is six times less per barrel recovered than for continuous carbon dioxide flooding after 35 percent recovery of residual oil. By continuing the alternate injection foam emplacement regime in test 4, as much as 65 percent of the oil can be recovered at no greater expense of carbon dioxide per barrel than is needed for percent recovery in Test 1 using continuous carbon dioxide flooding.

The results of Test 4 above indicate that the most economical and efficient recovery using the method of this invention occurs very early in the flooding regime when between 10 and 20 percent of the total amount of the carbon dioxide used in the test has been injected. Continuing the flooding regime results in higher recovery than in any other method used, but the rate of recovery increasingly diminishes. One skilled in the art will recognize that this pattern of high initial output and continuously decreasing rate of recovery is common to other flooding techniques that employ alternate injection of carbon dioxide and fluids. For instance, alternate injection of small slugs of carbon dioxide and water in Test 2 achieves the same percent recovery when only half the carbon dioxide has been injected as is recovered by the full regime of continuous carbon dioxide flooding in Test 1. Despite overall similarity of the recovery patterns exhibited in Tests 2 and 4, however, the alternate injection foam emplacement process exhibits significantly improved overall recovery as compared with alternate injection of carbon dioxide and water at markedly less consumption of carbon dioxide per barrel of oil recovered. This marked increase in overall recovery is attributed to increased efficiency of the areal sweep, which ensures that the carbon dioxide contacts a high percentage of the residual oil in place.

Merely diluting a continuously injected carbon dioxide flood with 11 volume percent of insoluble gas, as in Test 3, results in 10 percent less oil recovery than if undiluted carbon dioxide is employed, as can be seen by comparing the results of Tests 1 and 3. However, alternate injection of the same diluted carbon dioxide gas mixture with a solution containing surfactant in accordance with the practice of this invention unexpectedly almost doubles the yield, and the data clearly indicate that an increase in yields by a factor of 0.75 over those obtained with continuous injection of carbon dioxide gas are achievable. Due to the foam generated in situ blocking escape of the solvent gas into the highly permeable channels of the core, the solvent gas more efficiently contacts and reduces the viscosity of the residual oil in place so that the overall recovery is increased by a factor of 0.86 over that achieved by continuous injection of carbon dioxide above.

TEST 5

A Field Test is conducted to determine the effect upon permeability of foam emplacement into highly permeable zones. Location of the site used for Field Test 5 is Block V in the Wilmington Field, Calif. The depth of the reservoir, FZ 214 Rd, is about 2300 feet and its temperature and pressure are about 130° F. and 900 to 1100 p.s.i.g., respectively. The permeability to air of the producing formations is between about 100 and 1000 millidarcies, and the oil in place is found to have a gravity of about 13° to 14° API.

The reservoir area covers approximately 320 surface acres and is faulted on three sides, the fourth side being embanked by water injection wells to prevent escape of the carbon dioxide and other enhanced recovery fluids. The area includes 8 injection wells and 47 producing wells. Prior to foam emplacement, of the eight injection wells four inject carbon dioxide at pressures well below those required for miscible displacement, up to about 1440 p.s.i.g., and four inject water at pressures of 1600 or 1800 p.s.i.g. Once a predetermined size of slug has been administered, the wells switch injection fluids; those wells that had been injecting carbon dioxide switch to water injection, and those that had been injecting water switch to carbon dioxide.

This method, known as an immiscible water-alternating gas, or WAG, method is selected to help control injectivity problems in an unconsolidated sand formation. Injection history for the well to be treated, FZ 214 Rd of Block V, Wilmington field, shows that almost all the injected fluids have entered upper wet sand Zone S, while Zone T, a lower zone of comparatively lower permeability, has taken no fluid during the WAG injection regime.

To prepare for foam emplacement, the zone of lowest permeability, which requires no further reduction in permeability, is protected by gravel packing. Once the foam emplacement regime has been completed, the gravel is recirculated out of the well so that subsequently injected carbon dioxide will be free to enter this oil-bearing layer.

It is determined that success of foam emplacement will be measured by (1) the decrease of gas and liquid entering upper Zone S and the corresponding increase into adjacent lower sand Zone T; (2) the decrease in injectivity of gas into the well; (3) the reduced amount of gas produced from surrounding wells; and (4) the length of time the beneficial changes in flow are maintained. During the alternate injection foam emplacement regime, the water wells inject a solution of Alipal CD 128 foaming agent having a density of 370 pounds per barrel and a concentration of 1000 barrels of water and 1 barrel of Alipal CD 128 foaming agent. The gas mixture injected during foam emplacement contains gaseous carbon dioxide, between about 15 and 8 volume percent of nitrogen, and a small amount of methane. This mixture is obtained by recovering gas produced during WAG injection, which begins as substantially pure carbon dioxide, but becomes sufficiently diluted with noncondensible, crude oil-insoluble, non-hydrocarbon gas during passage through the reservoir to be recycled as the gas mixture during foam emplacement. In Table II, the alternate injection sequence for the foam emplacement regime is summarized.

TABLE II

| Injection Sequence for Foam Emplacement Regime | |
| --- | --- |
| Day | Injection Fluid |
| 1 | 2 bbls. of X-cide XC 137 in 5000 bbls. of water |
| 2 | 50 bbls. of Alipal CD 128 in 5000 bbls. of water |
| 3 | 4 MM SCF of $CO_2$—$N_2$ mixture |
| 4 | 4 MM SCF of $CO_2$—$N_2$ mixture |
| 5 | 4 MM SCF of $CO_2$—$N_2$ mixture |
| 6 | 25 bbls. of Alipal CD 128 in 2500 bbls. of water |
| 7 | 12 MM SCF of $CO_2$—$N_2$ mixture |
| 8 | 33 bbls. of Alipal CD 128 in 3300 bbls. of water |
| 9 | 4 MM SCF $CO_2$—$N_2$ mixture |
| 10 | 4 MM SCF $CO_2$—$N_2$ mixture |
| 11 | Inject maximum amount of $CO_2$—$N_2$ mixture at 1330 p.s.i.g. and run injection profile survey. Run bottomhole pressure falloff tests with injection water |
| 20 | 25 bbls. of Alipal 128 in 2500 bbls. of water |
| 21 | 4 MM SCF of $CO_2$—$N_2$ mixture |
| 22 | 4 MM SCF of $CO_2$—$N_2$ mixture |
| 23 | 4 MM SCF of $CO_2$—$N_2$ mixture |
| 24 | 25 bbls. of Alipal 128 in 2500 bbls. of water |
| 25 | 4 MM SCF of $CO_2$—$N_2$ mixture |
| 26 | 4 MM SCF of $CO_2$—$N_2$ mixture |
| 27 | 4 MM SCF of $CO_2$—$N_2$ mixture |
| 28 | 25 bbls. of Alipal CD 128 in |

TABLE II-continued

Injection Sequence for Foam Emplacement Regime

| Day | Injection Fluid |
|---|---|
|  | 2500 bbls. of water |
| 29 | 4 MM SCF of $CO_2$—$N_2$ mixture |
| 30 | 4 MM SCF of $CO_2$—$N_2$ mixture |
| 31 | 4 MM SCF of $CO_2$—$N_2$ mixture |
| 32 | 25 bbls. of Alipal 128 in 2500 bbls. of water |
| 33 | 4 MM SCF of $CO_2$—$N_2$ mixture |
| 34 | 4 MM SCF of $CO_2$—$N_2$ mixture |
| 35 | 4 MM SCF of $CO_2$—$N_2$ mixture |
|  | Run $CO_2$ injection profile survey. |
|  | Run bottomhole pressure falloff tests with injection water. |

During foam emplacement, the solution of Alipal CD 128 and the nitrogen-carbon dioxide gas mixture are injected alternately according to the sequence summarized in Table II. Gas pressure is maintained below about 1440 p.s.i.g. so that the density of the gas mixture in the reservoir remains at or below 0.42 grams per cubic centimeter throughout. It will be noted that a gas injection profile survey and a bottomhole pressure falloff test using injection water are conducted by techniques well known in the art after the 11th and 35th days to measure the effect of the foam emplacement process during its progress. Results of the pressure fall off tests and the gas injection profile tests are summarized in Tables III and IV.

TABLE III

Pressure Falloff Test Results

|  | Pre Foam | Intermediate After 11th day | After Foam After 35th day |
|---|---|---|---|
| Permeability(md) | 100.7 | 32.4 | 14.2 |
| Skin factor | 10.1 | 1.5 | −0.9 |
| Radius of investigation (ft) | 1406 | 587 | 396 |

TABLE IV

Carbon Dioxide-Nitrogen Injection Survey Tests

|  |  |  | After Foam | |
|---|---|---|---|---|
|  | Pre Foam | Intermediate After 11th day | After 35th day | After 46th day |
| Injection Rate (MCD/day) | 13,125 | 7,725 | 4,610 | 3,190 |
| Injection Pressure (p.s.i.g.) | 1,340 | 1,300 | 1,320 | 1,330 |
| Percent Injected by Sand Zone |  |  |  |  |
| S | 98.7 | 82 | 56.7 | 70.6 |
| T | 1.3 | 18 | 43.3 | 29.2 |

These tests indicate that as the result of foam emplacement, permeability is reduced by more than 85 millidarcies while the rate of gas injection decreases by greater than 75 percent. The beneficial effects of the foam emplacement are still appparent after 46 days, so it can be predicted that the treatment will produce long-term improvements in injectivity and injection rates. In addition, after 46 days the excessive flow of recovery fluids into Zone S, the wet sand zone of high permeability, is reduced by 28 percent while flow into adjacent sand Zone T is increased to about 30 percent.

Although the invention has been described in conjunction with embodiments thereof, including a preferred embodiment, it is apparent that the invention is capable of many modifications, alternatives and variations. Accordingly, it is intended to embrace within the invention all such modifications, alternatives and variations as may fall within the spirit and scope of the appended claims.

I claim:

1. A method for reducing the permeability of higher permeability zones of an oil bearing subterranean reservoir having heterogeneous permeability and being penetrated by at least one well, said method comprising:
   (1) injecting through a well and into said reservoir:
      (a) an aqueous liquid solution of a water soluble surface active agent;
      (b) a foam emplacement gas mixture consisting essentially of carbon dioxide and a crude oil-insoluble, noncondensible, non-hydrocarbon gas, the injection being under conditions such that the gas mixture maintains a density between 0.01 and 0.42 grams per centimeter in the reservoir;
   (2) allowing stable foam to form in said higher permeability zones;
   (3) diverting subsequently injected gases into lower permeability zones of the reservoir without destroying the stable foam; and
   (4) producing oil from said reservoir.

2. The method of claim 1 wherein the foam emplacement gas mixture contains between about 0.5 and 20 volume percent of the crude oil-insoluble, noncondensible, non-hydrocarbon gas.

3. The method of claim 1 wherein the solution of surface-active agent contains between about 0.1 and 2.0 weight percent active surface-active agent and the amount of the solution injected is between about 0.1 and 10 volume percent of the total fluids injected in steps (1) and (2).

4. The method of claim 3 wherein between about 0.01 and 0.2 effective pore volume of the foam emplacement gas mixture and between about 0.01 and 0.1 effective pore volume of a 0.1 to 2.0 weight percent active solution of said surface-active agent is injected.

5. The method of claim 4 wherein the surface-active agent is dissolved in seawater.

6. The method of claim 1 wherein the crude oil-insoluble, noncondensible, non-hydrocarbon gas is selected from the group consisting of nitrogen, air, argon, or mixtures thereof.

7. The method of claim 6 wherein the crude oil-insoluble, noncondensible gas is nitrogen.

8. The method of claim 4 wherein a total of between about 0.01 and 0.05 effective pore volume of the gas mixture is injected.

9. The method of claim 4 wherein a total of between about 0.01 and 0.05 effective pore volume of the gas mixture is injected and between about 0.01 and 0.05 effective pore volume of a 0.5 to 1.0 weight percent active solution of surface active agent is injected.

10. A method for reducing the permeability of higher permeability zones of a subterranean reservoir containing viscous crude oil, having heterogeneous permeability, and being penetrated by at least one injection well and one producing well comprising:
   (1) injecting sequentially through an injection well and into said reservoir:
      (a) a quantity of a gas flooding mixture comprising carbon dioxide sufficient to result in breakthrough of carbon dioxide at a producing well, said injection being at conditions such that the gas flooding mixuture maintains a density between about 0.01 and 0.42 grams per centimeter in the reservoir;

(b) a liquid solution comprising a surface-active agent and a solvent for said surface-active agent selected from the group consisting of aqueous and hydrocarbon solvents;

(c) a foam emplacement gas mixture consisting essentially of carbon dioxide and a crude oil-insoluble, noncondensible, non-hydrocarbon gas, said injection being at conditions such that the foam emplacement gas mixture maintains a density between about 0.01 and 0.42 grams per centimeter in the reservoir;

(2) allowing a stable foam to form in said higher permeability zones by interaction of the solution of surface active agent and the crude oil-insoluble, noncondensible, non-hydrocarbon gas so that the permeability of said zones is thereby reduced; and (3) diverting subsequently injected gases into lower permeability zones of the reservoir without destroying the stable foam.

11. The method of claim 10 wherein the foam emplacement gas mixture contains between about 0.5 and 20 volume percent of the crude oil-insoluble, noncondensible gas.

12. The method of claim 10 wherein the foam emplacement gas mixture contains between about 10 and 15 volume percent of the crude oil-insoluble, noncondensible, non-hydrocarbon gas.

13. The method of claim 10 wherein the solution of surface-active agent contains between about 0.1 and 2.0 weight percent active surface-active agent and the amount of the solution injected is between about 0.1 and 10 percent of the total fluids injected in steps (1) and (2).

14. The method of claim 10 wherein between about 0.01 and 0.2 pore volume of the foam emplacement gas mixture and between about 0.01 and 0.2 effective pore volume of a 0.1 to 2.0 weight percent active solution of surface-active agent is injected.

15. The method of claim 10 wherein between about 0.01 and 0.05 effective pore volume of a 0.5 to 1.0 percent solution of surface-active agent is injected followed by injection of between about 0.01 and 0.05 effective pore volume of the foam emplacement gas mixture.

16. The method of claim 13 wherein the surface-active agent is selected from the group consisting of dioctyl sodium sulfosuccinates, modified ether alcohol sulfate sodium salts, sodium lauryl sulfate, dioctyl sodium sulfosuccinate, and alkyl polyethylene oxide sulfates and the crude oil-insoluble, noncndensible gas is selected from the group consisting of nitrogen, air, argon, and mixtures thereof.

17. The method of claim 13 wherein the crude oil-insoluble, noncondensible, non-hydrocarbon gas comprises nitrogen.

18. A method of enhanced recovery of viscous oil from a subterranean formation having a heterogeneous permeability and containing viscous crude oil, said formation being penetrated by at least one injection well and at least one recovery well comprising:

(1) utilizing the method of claim 10 for reducing the permeability of the higher permeability zones of the heterogeneous formation to form a stable foam therein;

(2) injecting through the injection well and into the less permeable zones of the formation a gas flooding mixture comprising carbon dioxide so that the viscosity of the viscous oil is thereby reduced without destroying the stable foam;

(3) injecting sufficient drive fluid through said injection well so that reduced viscosity oil is displaced from said reservoir; and (4) recovering the reduced viscosity oil displaced from said reservoir through a recovery well.

19. The method of claim 18 wherein the foam emplacement gas mixture contains between about 0.5 and 20 volume percent of a crude oil-insoluble, noncondensible gas.

20. The method of claim 18 wherein the solution comprising a surface active agent contains between about 0.5 and 1.0 percent active surface-active agent and the amount of the solution injected is between about 0.1 and 10 volume percent of the total fluids injected in step (1).

21. The method of claim 20 wherein the surface-active agent is dissolved in seawater.

22. The method of claim 20 wherein the surface-active agent is selected from the group consisting of dioctyl sodium sulfosuccinates, modified ether alcohol sulfate sodium salts, sodium lauryl sulfate, dioctyl sodium sulfosuccinate, and alkyl polyethylene oxide sulfates.

23. The method of 20 wherein the surface active agent is an alkyl polyethylene oxide sulfate.

24. A method for reducing the permeability of higher permeability zones of a subterranean reservoir containing viscous crude oil and having heterogeneous permeability, said reservoir being penetrated by at least one producing well and one injection well comprising:

(1) injecting through a well and into said reservoir:

(a) a quantity of a gas flooding mixture comprising carbon dioxide sufficient to result in breakthrough of carbon dioxide gas at a producing well, the injection being under conditions such that the gas flooding mixture maintains a density between about 0.01 and 0.42 grams per centimeter in said reservoir;

(b) alternate slugs of (1) an aqueous liquid solution of a water soluble surface-active agent and (2) a gas mixture consisting essentially of carbon dioxide and a crude oil-insoluble, noncondensible, non-hydrocarbon gas;

(2) allowing a stable foam to form in said higher permeability zones by interaction of said solution of surface active agent and said crude oil-insoluble, noncondensible, non-hydrocarbon gas so that the permeability of said zones is thereby reduced; and (3) diverting subsequently injected flooding gases into the lower permeability zones of the reservoir without destroying the stable foam.

25. The method of claim 24 wherein the foam emplacement gas mixture contains between about 0.5 and 20 volume percent of a crude oil-insoluble, noncondensible, non-hydrocarbon gas.

26. The method of claim 24 wherein the solution comprising a surface-active agent contains between 0.1 and 2.0 weight percent active surface-active agent and the amount of the solution injected is between about 0.1 and 10 volume percent of the total fluids injected in step (1).

27. The method of claim 24 wherein the foam emplacement gas mixture contains between 10 and 15 volume percent of crude oil-insoluble, noncondensible, non-hydrocarbon gas.

28. The method of claim 27 wherein the solution comprising a surface active agent contains between 0.5 and 1.0 weight percent active surface-active agent, and between 4 and 10 alternate slugs of surface-active solution and foam emplacement gas mixture are employed.

29. The method of claim 24 wherein the surface active agent is dissolved in water.

30. The method of claim 24 wherein the surface-active agent is dissolved in seawater.

31. The method of claim 24 wherein the surface-active agent is dissolved in brine.

32. The method of claim 24 wherein the crude oil-insoluble, noncondensible, non-hydrocarbon gas is nitrogen.

33. The method of claim 24 wherein the surface-active agent is selected from the group consisting of dioctyl sodium sulfosuccinate, modified ether alcohol sulfate sodium salts, sodium lauryl sulfate, dioctyl sodium sulfosuccinate, and alkyl polyethylene oxide sulfates.

34. The method of claim 24 wherein the surface-active agent comprises alkyl polyethylene oxide sulfates.

35. The method of claim 24 wherein the slugs of the solution of surface-active agent are between 0.001 and 0.01 effective pore volume of the reservoir in size; the slugs of the foam emplacement gas mixture containing crude oil-insoluble, noncondensible gas are between 0.002 and 0.1 effective pore volume of the reservoir in size; and between about 4 and 10 alternating cycles of injection are performed in step (1)(b).

36. The method of claim 24 wherein the crude oil-insoluble, noncondensible, non-hydrocarbon gas is selected from the group consisting of nitrogen, air, argon, or mixtures thereof and the surface-active agent is selected from the group consisting of dioctyl sodium sulfosuccinate, modified ether alcohol sulfate sodium salts, sodium lauryl sulfates, dioctyl sodium sulfosuccinate, and alkyl polyethylene oxide sulfates.

37. The method of claim 36 wherein the crude oil-insoluble, noncondensible, non-hydrocarbon gas is nitrogen.

38. The method of claim 36 wherein the solution of surface-active agent contains between about 0.1 and 2.0 weight percent of active surface-active agent, the slugs of the solution of surface active agent are between about 0.001 and 0.01 effective pore volume in size, and the slugs of the foam emplacement gas mixture are between about 0.002 and 0.1 effective pore volume in size, and between about 5 and 7 alternating cycles of injection are preformed in step (1)(b).

39. A method for enhanced recovery of viscous oil from a subterranean formation having heterogeneous permeability and containing viscous crude oil, said formation being penetrated by at least one injection well and one recovery well comprising:
(1) utilizing the method of claim 24 for reducing the permeability of the higher permeability zones of the heterogeneous formation by formation of a stable foam therein;
(2) injecting through the injection well and into the lower permeability zones of the formation a gas flooding mixture comprising carbon dioxide so that the density of the gas flooding mixture is between about 0.01 and 0.42 grams per cubic centimeter within the reservoir, the viscosity of the crude oil thereby being reduced;
(3) injecting sufficient drive fluid to displace the crude oil having reduced viscosity from the formation; and
(4) recovering crude oil of lowered viscosity from a producing well without destroying the stable foam.

40. A method for enhanced recovery of viscous oil from a subterranean formation having heterogeneous permeability and containing viscous crude oil, said formation being penetrated by at least one injection well and one recovery well, said method comprising:
(1) utilizing the method of claim 35, 36, or 38 for reducing the permeability of the higher permeability zones of the heterogeneous formation to place a stable foam therein;
(2) injecting through an injection well and into the less permeable zones of the formation a gas flooding mixture comprising carbon dioxide so that the gas flooding mixture has a density between 0.01 and 0.42 grams per centimeter within the reservoir without substantial damage to the stable foam in the higher permeability zones;
(3) injecting sufficient drive fluid through said injection well to displace crude oil from said reservoir; and
(4) recovering crude oil displaced from said reservoir through a recovery well.

41. A method for reducing the permeability of higher permeability zones of an oil bearing subterranean reservoir having heterogeneous permeability and being penetrated by at least one well, said method comprising:
(1) injecting through a well and into said reservoir:
  (a) an aqueous liquid solution of a water soluble surface-active agent;
  (b) a foam emplacement gas mixture comprising carbon dioxide and a crude oil-insoluble, noncondensible, non-hydrocarbon gas, said gas being in a concentration between 5 and 20 volume percent of the mixture and the injection being under conditions such that the gas mixture maintains a density between 0.01 and 0 42 grams per centimeter in the reservoir;
(2) allowing a stable foam to form in said higher permeability zones;
(3) diverting subsequently injected gases into lower permeability zones of the reservoir without destroying the stable foam; and
(4) producing oil from said reservoir.

42. The method of claim 41 wherein the solution of surface-active agent contains between about 0.1 and 2.0 weight percent active surface-active agent and the amount of the solution injected is between about 0.1 and 10 volume percent of the total fluids injected in steps (1) and (2).

43. The method of claim 41 wherein the crude oil-insoluble, noncondensible, non-hydrocarbon gas is selected from the group consisting of nitrogen, air, argon, or mixtures thereof.

44. The method of claim 41 wherein the crude oil-insoluble, noncondensible gas is nitrogen.

45. The method of claim 41 wherein a total of between about 0.01 and 0.05 effective pore volume of the gas mixture is injected.

46. A method for reducing the permeability of higher permeability zones of a subterranean reservoir containing viscous crude oil, having heterogeneous permeability, and being penetrated by at least one injection well and one producing well comprising:
(1) injecting sequentially through an injection well and into said reservoir:
  (a) a quantity of a gas flooding mixture comprising carbon dioxide sufficient to result in breakthrough of carbon dioxide at a producing well, said injection being at conditions such that the gas flooding mixture maintains a density between about 0.01 and 0.42 grams per centimeter in the reservoir;

(b) a liquid solution comprising a surface-active agent and a solvent for said surface-active agent selected from the group consisting of aqueous and hydrocarbon solvents;

(c) a foam emplacement gas mixture comprising carbon dioxide and a crude oil-insoluble, noncondensible, non-hydrocarbon gas, said gas being in a concentration between 5 and 20 volume percent of the mixture and said injection being at conditions such that the foam emplacement gas mixture maintains a density between about 0.01 and 0.42 grams per centimeter in the reservoir; and (2) allowing a stable foam to form in said higher permeability zones by interaction of the solution of surface active agent and the crude oil-insoluble, noncondensible, non-hydrocarbon gas so that the permeability of said zones is thereby reduced; and (3) diverting subsequently injected gases into lower permeability zones of the reservoir without destroying the stable foam.

47. The method of claim 46 wherein the foam emplacement gas mixture contains between about 10 and 15 volume percent of the crude oil-insoluble, noncondensible, non-hydrocarbon gas.

48. The method of claim 46 wherein between about 0.01 and 0.2 pore volume of the foam emplacement gas mixture and between about 0.01 and 0.2 effective pore volume of a 0.1 to 2.0 weight percent active solution of surface-active agent is injected.

49. A method of enhanced recovery of viscous oil from a subterranean formation having a heterogeneous permeability and containing viscous crude oil, said formation being penetrated by at least one injection well and at least one recovery well comprising:

(1) utilizing the method of claim 41 for reducing the permeability of the higher permeability zones of the heterogeneous formation to form a stable foam therein;

(2) injecting through the injection well and into the less permeable zones of the formation a gas flooding mixture comprising carbon dioxide so that the viscosity of the viscous oil is thereby reduced without destroying the stable foam;

(3) injecting sufficient drive fluid through said injection well so that reduced viscosity oil is displaced from said reservoir; and (4) recovering the reduced viscosity oil displaced from said reservoir through a recovery well.

50. A method for reducing the permeability of higher permeability zones of a subterranean reservoir containing viscous crude oil and having heterogeneous permeability, said reservoir being penetrated by at least one producing well and one injection well comprising:

(1) injecting through a well and into said reservoir:

(a) a quantity of a gas flooding mixture comprising carbon dioxide sufficient to result in breakthrough of carbon dioxide gas to a producing well, the injection being under conditions such that the gas flooding mixture maintains a density between about 0.01 and 0.42 grams per centimeter in said reservoir;

(b) alternate slugs of (1) an aqueous liquid solution of a water soluble surface-active agent and (2) a gas mixture comprising carbon dioxide and a crude oil-insoluble, noncondensible, non-hydrocarbon gas, said gas being in a concentration between about 5 and 20 volume percent of the mixture; and (2) allowing a stable foam to form in said higher permeability zones by interaction of said solution of surface active agent and said crude oil-insoluble, noncondensible, non-hydrocarbon gas so that the permeability of said zones is thereby reduced.

51. The method of claim 50 wherein the foam emplacement gas mixture contains between 10 and 15 volume percent of crude oil-insoluble, noncondensible, non-hydrocarbon gas.

52. The method of claim 50 wherein the solution comprising a surface active agent contains between 0.5 and 1.0 weight percent active surface-active agent, and between 4 and 10 alternate slugs of surface-active solution and foam emplacement gas mixture are employed.

53. The method of claim 50 wherein the crude oil-insoluble, nonncondensible, non-hydrocarbon gas is nitrogen.

54. The method of claim 50 wherein the slugs of the solution of surface-active agent are between 0.001 and 0.01 effective pore volume of the reservoir in size; the slugs of the foam emplacement gas mixture containing crude oil-insoluble, noncondensible gas are between 0.002 and 0.1 effective pore volume of the reservoir in size; and between about 4 and 10 alternating cycles of injection are performed in step (1)(b).

* * * * *